(12) United States Patent
Kitamura (10) Patent No.: US 9,079,314 B2
(45) Date of Patent: Jul. 14, 2015

(54) ROBOT HAND FOR GRIPPING CYLINDRICAL OBJECT AND ROBOT HAVING THE ROBOT HAND

(71) Applicant: Fanuc Corporation, Minamitsuru-gun, Yamanashi (JP)

(72) Inventor: Ryoji Kitamura, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 14/529,356

(22) Filed: Oct. 31, 2014

(65) Prior Publication Data

US 2015/0123416 A1 May 7, 2015

(51) Int. Cl.
*B66C 1/42* (2006.01)
*B25J 15/00* (2006.01)
*B25J 15/08* (2006.01)

(52) U.S. Cl.
CPC .......... *B25J 15/0047* (2013.01); *B25J 15/0038* (2013.01); *B25J 15/08* (2013.01); *Y10S 901/32* (2013.01); *Y10S 901/34* (2013.01); *Y10S 901/36* (2013.01)

(58) Field of Classification Search
CPC .... B25J 15/0047; B25J 15/0038; B25J 15/08; B25J 15/026; B25J 13/082; B25J 15/0009; B25J 15/00; B25J 15/0226; B25J 9/023; B25J 9/104; B25J 15/04; B25J 9/1612; Y10S 901/36; Y10S 901/34; Y10S 901/32; H01L 21/68707; A61F 2/583; B25B 9/00; G01N 35/00029; G01N 21/07; G01N 35/026; E02F 3/404
USPC ...................................................... 294/119.1
See application file for complete search history.

(56) References Cited

U.S. PATENT DOCUMENTS

| | | | | |
|---|---|---|---|---|
| 5,280,981 A * | 1/1994 | Schulz | ........................ | 294/106 |
| 6,264,419 B1 * | 7/2001 | Schinzel | ................... | 414/751.1 |
| 6,458,324 B1 * | 10/2002 | Schinzel | ........................ | 422/65 |
| 6,652,015 B1 * | 11/2003 | Carney et al. | ................ | 294/86.4 |
| 8,132,837 B2 * | 3/2012 | Pedrazzini | .................. | 294/86.4 |
| 2012/0286536 A1 | 11/2012 | Murakami | | |

FOREIGN PATENT DOCUMENTS

| | | |
|---|---|---|
| JP | 2004-345051 A | 12/2004 |
| JP | 2006326799 | 12/2006 |
| JP | 2009269127 | 11/2009 |
| JP | 2011-083837 A | 4/2011 |
| JP | 2011073100 | 4/2011 |
| JP | 2011-157200 | 8/2011 |
| JP | 2012218105 | 11/2012 |
| JP | 2012236265 | 12/2012 |

* cited by examiner

*Primary Examiner* — Stephen Vu (74) *Attorney, Agent, or Firm* — RatnerPrestia (57) ABSTRACT

An inexpensive and compact robot hand and a robot having the robot hand, wherein the robot hand is configured to rotate a cylindrical object gripped by the robot hand and does not negatively affect a cable, etc., connected to the robot hand. N number of fingers are moved by a first drive part so that a circumcircle of a N-sided polygon constituted by the fingers is arranged in a concentric pattern about the center axis of the object. Each first roller is rotatable about an axis parallel to the center axis of the object, and is configured to contact the inner peripheral portion of the object by movement of the finger relative to a hand base. By rotationally driving at least one first roller while a radially outward force is applied to the object, the object may be rotated relative to the hand base.

7 Claims, 10 Drawing Sheets

ROBOT HAND FOR GRIPPING CYLINDRICAL OBJECT AND ROBOT HAVING THE ROBOT HAND

BACKGROUND OF THE INVENTION

1. Field of the Invention

The present invention relates to a robot hand for gripping and conveying a cylindrical object, and relates to a robot having the robot hand.

2. Description of the Related Art

In the prior art, various devices have been known for gripping and conveying a cylindrical object. For example, JP 2004-345051 A discloses a gripping device having a drive shaft gear 2, three driven gears 3 which engages an outer diameter of drive shaft gear 2 and are equally-spaced in a circumferential direction of gear 2, and a claw 6 extending in an axial direction from an arm 5 which is pivotal about a driven shaft 4 of each driven gear.

JP 2011-083837 A discloses a robot hand configured to grip an inner or outer surface of a workpiece 10 by means of three or more hand claws 14, and insert workpiece 10 into a chuck position of a work chuck device. Further, it is described that the robot hand has a free-rotation mechanism for freely rotating workpiece 10 when external force in a rotational direction about an axis is applied to workpiece 10 gripped by hand claws 14.

Further, JP 2011-157200 A discloses a tire selecting device wherein gripping arms 24a to 24c, respectively having freely-rotating rollers R11 to R13, grip an inner peripheral portion of a tire, and a barcode on the tire is read by rotating the tire.

In a structure wherein a robot hand is rotatably attached to a robot arm via a rotatable wrist shaft, when the robot hand is rotated by a certain angle or more, a cable connected to the hand may become tangled in the wrist shaft and/or excess external force may be applied to the cable. Therefore, in many cases, the rotation angle of the wrist shaft is limited to a certain range. Further, when a means to grip an object and a means to rotate the object are different, although there is no limitation regarding the rotation angle, the entire apparatus may be large, whereby such an apparatus is disadvantageous in terms of cost and operation.

SUMMARY OF THE INVENTION

An object of the present invention is to provide an inexpensive and compact robot hand and a robot having the robot hand, wherein the robot hand is configured to rotate an abject gripped by the robot hand and does not negatively affect a cable, etc., connected to the robot hand.

According to one aspect of the present invention, there is provided a robot hand configured to grip an inner or outer peripheral portion of a cylindrical object and rotate the object about a center axis of the object while gripping the object, the robot hand comprising: a hand base attached to a front end of a robot arm; N number of fingers movably attached to the hand base, wherein each finger extends parallel to the center axis of the object gripped by the fingers and is positioned at each vertex of a N-sided polygon in a plane perpendicular to the center axis; a first drive part which moves the N number of fingers relative to the hand base so that a circumcircle of the N-sided polygon is arranged in a concentric pattern about the center axis; N number of first rollers respectively attached to the N number of fingers, wherein each first roller is rotatable about an axis parallel to the center axis and is configured to contact the inner or outer peripheral portion of the object by movement of the finger relative to the hand base; and a second drive part which rotates at least one of the N number of first rollers, wherein N is a natural number of three or more.

In a preferred embodiment, the N number of fingers are configured to be simultaneously moved by the same distance by means of one first drive part.

In a preferred embodiment, the robot hand comprises: N number of linear moving parts respectively attached to the N number of fingers and configured to linearly move in the extending direction of the finger; a third drive part which linearly drives the linear moving parts relative to the respective fingers; second rollers attached to the respective linear moving parts so that the second roller is rotatable about an axis along a radial direction of the circumcircle; and third rollers arranged on portions of the respective N number of fingers farther than the respective second rollers from the hand base in relation to the center axis, wherein the third rollers have rotation axes parallel to rotation axes of the respective second rollers.

In this case, it is preferable that the N number of linear moving parts be connected to one support by means of a link mechanism which is displaceable in a plane perpendicular to the center axis, and one support be linearly moved by means of one third drive part.

Further, it is preferable that the cylindrical object be restrained by means of the second and third rollers by force control based on feedback detection of restraining force in the axial direction generated by the second and third rollers.

Still further, it is preferable that at least one of the first, second and third drive parts be a servomotor.

In a preferred embodiment, the cylindrical object is gripped by means of the N number of fingers by force control based on feedback detection of gripping force in the radial direction generated by the N number of fingers.

According to another aspect of the invention, there is provided a robot comprising the robot hand of the invention.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

Figure 1:
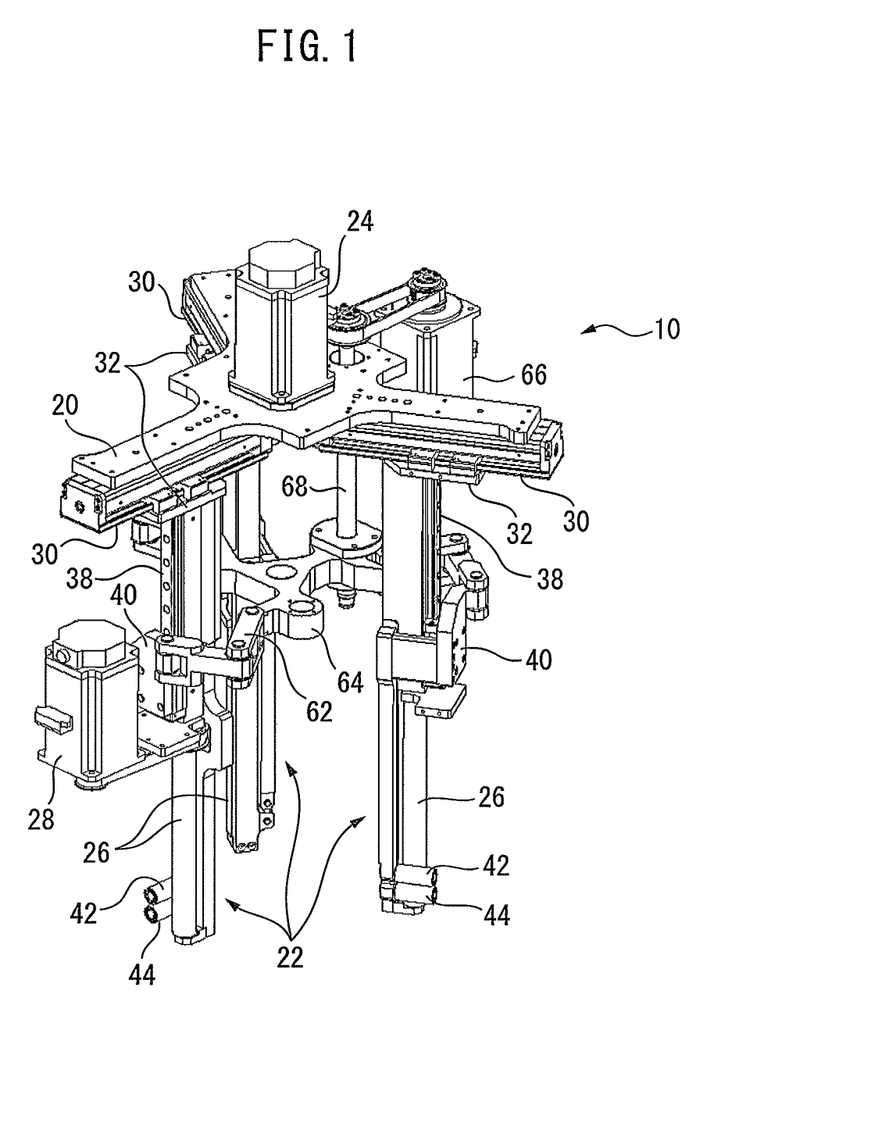
FIG. 1 is a perspective view of a robot hand according to a first embodiment of the present invention.
Figure 2:
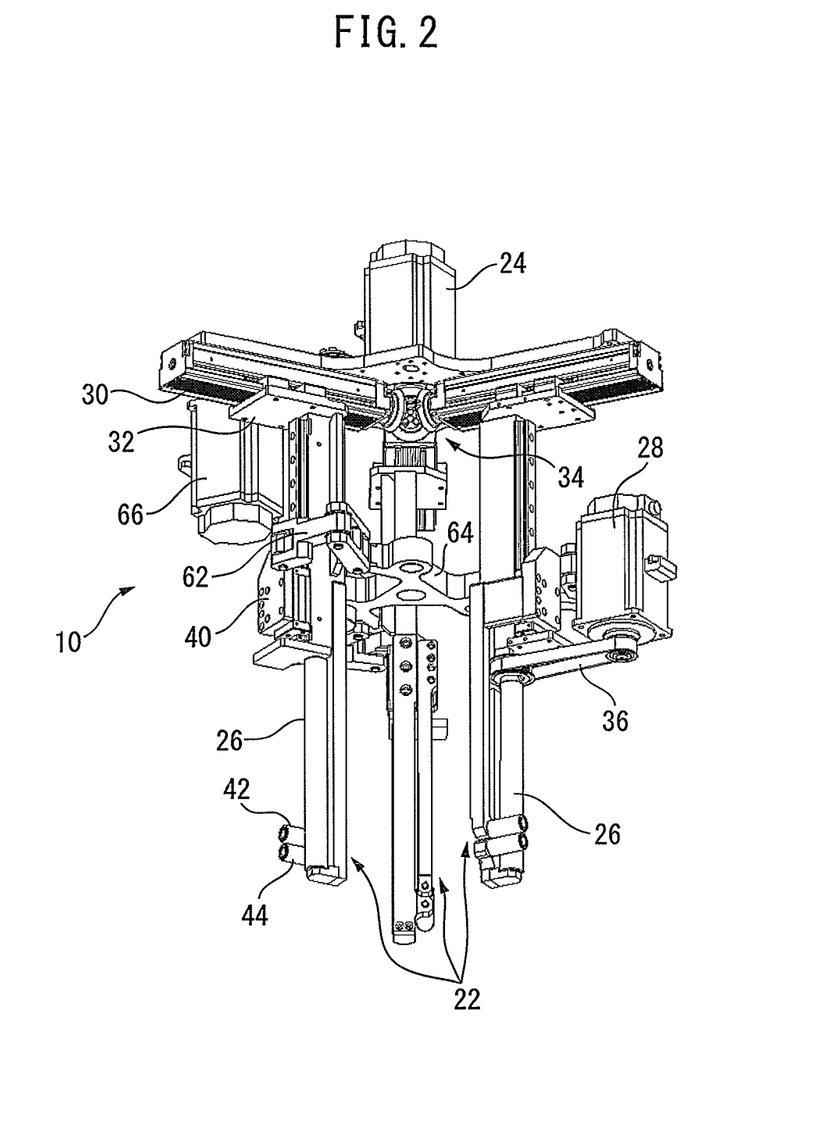
FIG. 2 is a perspective view of the robot hand of FIG. 1 viewed from obliquely below.
Figure 3A:
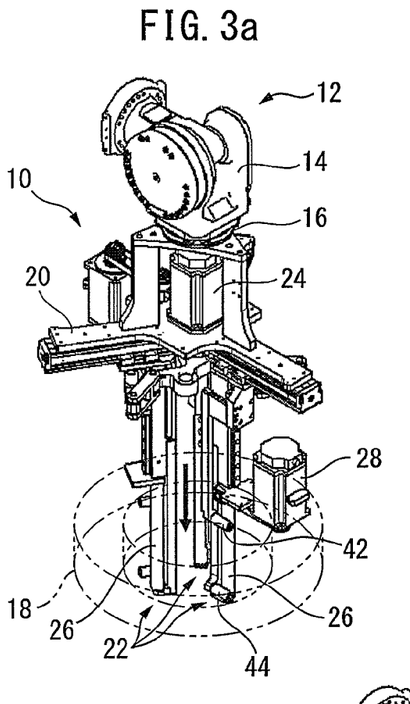
FIG. 3a is a view showing a state wherein fingers of the robot hand of FIG. 1 are inserted into a cylindrical object.

FIG. 1 is a perspective view of a robot hand 10 according to a first embodiment of the present invention, and FIG. 2 is a perspective view of robot hand 10 viewed from obliquely below. Robot hand 10 of FIG. 1 is attached to a front end of a robot arm 14 of a multi-joint robot 12 via a rotatable wrist axis 16, and is configured to grip an inner peripheral portion of a cylindrical object 18 and convey the object (see FIGS. 3a to 3c). In detail, robot hand 10 has a hand base 20 attached to (wrist axis 16 of) robot arm 14; N number of fingers 22 movably attached to hand base 20 (wherein N is a natural number of three or more); a first drive part 24 which moves N number of fingers 22 relative to hand base 20; N number of first rollers 26 respectively attached to N number of fingers 22; and a second drive part 28 which rotates at least one of N number of first rollers 26. In the first embodiment and a second embodiment as described below, N is three.

Each of N number of fingers 22 extends parallel to a center axis (along a generally vertical direction in the illustrated embodiment) of cylindrical object 18 gripped by robot hand 10 (see FIGS. 3b and 3c), and each finger 22 is positioned at each vertex of a N-sided polygon (preferably, a regular N-sided polygon) in a plane perpendicular to the center axis. Concretely, a first linear moving mechanism is arranged on a lower surface of hand base 20 (or a frontend-side of the hand), wherein the first mechanism includes N number of first guide rails 30 radially outwardly extending from a generally center of hand base 20, and a first slider 32 which is slidable on each first guide rail 30. Each finger 22 is movable relative to hand base 20 by being connected to slider 32.

N number of fingers 22 are moved by first drive part 24 so that a circumcircle of the N-sided polygon constituted by N number of fingers 22 is arranged in a concentric pattern about the center axis of object 18 (preferably, the circumcircle is always arranged in concentric pattern within a range of movement of first slider 32). In particular, as shown in FIG. 2, by using one first drive part 24, three first sliders 32 may be simultaneously moved by the same distance by means of a power transmission mechanism 34 (for example, a combination of a rotation axis of first drive part 24 and N number of bevel gears engaged to the rotation axis) arranged on generally the center of hand base 20. By virtue of this, a configuration, wherein N number of fingers 22 are radially moved by one drive part so that the fingers are always positioned on a concentric circle, can be easily realized.

Each of N number of first rollers 26, respectively attached to N number of fingers 22, is rotatable about an axis parallel to the center axis of cylindrical object 18, and is configured to contact the inner peripheral portion of object 18 by (radially outward) movement of finger 22 relative to hand base 20. Second drive part 28 is configured to rotationally drive at least one of N number of first rollers 26. In the illustrated embodiment, second drive part 28 rotationally drives one first roller 26 via power transmission means such as a timing belt 36. In this case, two remaining first rollers 26 are freely rotatable. Of course, two or more first rollers 26 may be rotationally driven. By arranging the circumcircle of the N-sided polygon constituted by N number of fingers 22 in a concentric pattern, the N number of fingers properly contact the inner peripheral portion of the cylindrical object. Further, by rotationally driving at least one first roller 26 while a radially outward force is applied to object 18, the object may be rotated relative to hand base 20.

Next, a mechanism for restraining the cylindrical object by a force in the axial direction of the object will be explained. As shown in FIGS. 1 and 2, robot hand 10 has a second linear moving mechanism including a second guide rail 38 arranged on each of N number of fingers 22 so as to extend in the extending direction of the finger, and a second slider (linear moving part) 40 which is slidable on each second guide rail 38. A second roller 42 is attached to each second slider 40, so that the second roller is rotatable about an axis along the radial direction of the circumcircle constituted by N number of fingers 22. Each second roller 42 is configured to contact an axial end of cylindrical object 18 due to the linear motion of corresponding second slider 40.

On portions of respective N number of fingers 22 (for example, front ends of the fingers), farther than respective second rollers 42 from hand base 20 in relation to the center axis, third rollers 44 are arranged. Each third roller 44 has a rotation axis parallel to a rotation axis of corresponding second roller 42. In other words, by means of the second linear mechanism, each second roller 42 can be moved toward or away from third roller 44 positioned on the same finger as the second roller, while the second roller is parallel to the third roller. In addition, although it is preferable that both second roller 42 and third roller 44 be freely rotatable without having a drive means, these rollers may be rotationally driven by motors, etc.

Figure 4A:
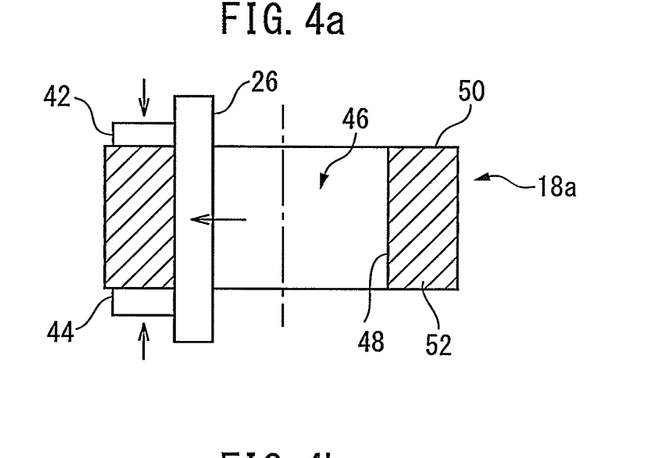
FIG. 4a is a view schematically showing an exemplified configuration for gripping an inner peripheral portion of a cylindrical object.
Figure 4B:
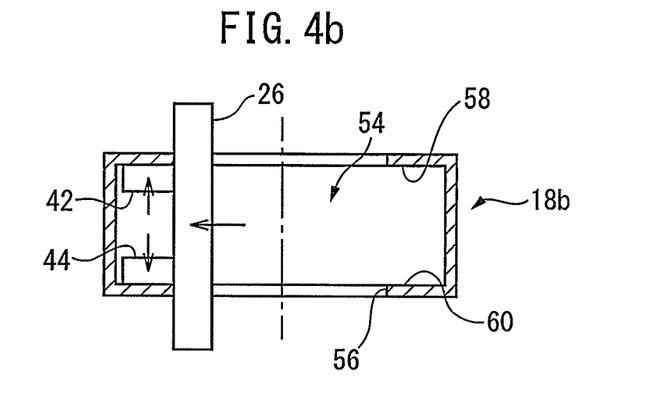
FIG. 4b is a view schematically showing another exemplified configuration for gripping an inner peripheral portion of a cylindrical object.
Figure 4C:
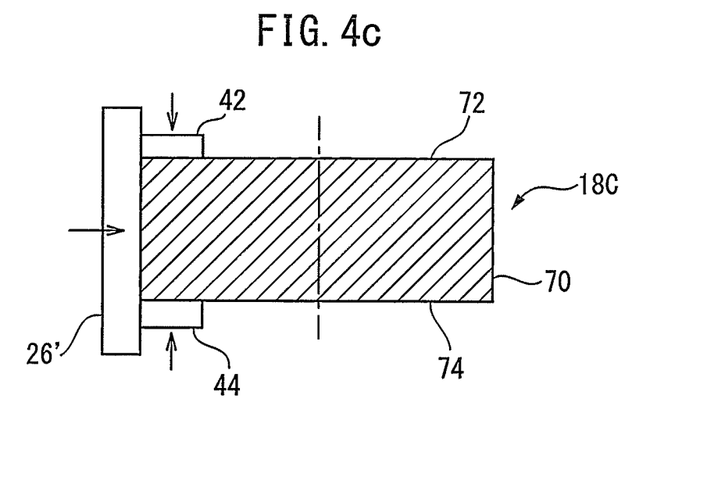
FIG. 4c is a view schematically showing an exemplified configuration for gripping an outer peripheral portion of a cylindrical object.

FIGS. 4a to 4c schematically show various examples wherein a cylindrical object is restrained or held in the axial direction thereof by means of second roller 42 and third roller 44. FIG. 4a shows a cylindrical object 18a having a hollow portion 46 and a relatively large wall thickness. In this example, first roller 26 is radially outwardly moved so as to contact an inner peripheral portion (surface) 48 of object 18a and grips object 18a. Second roller 42 and third roller 44 contact axial ends 50 and 52 of object 18a from the outside the object, respectively, so as to restrain the axial movement of object 18a.

FIG. 4b shows a cylindrical object 18b having a hollow portion 54 wider than hollow portion 46 and a relatively small wall thickness. In this example, similarly to the example of object 18a, first roller 26 is radially outwardly moved so as to contact an inner peripheral portion (surface) 56 of object 18b. However, second roller 42 and third roller 44 contact axial inner ends 58 and 60 of object 18b from the inside of the object, respectively, so as to restrain the axial movement of object 18b. An example of FIG. 4c will explained below.

As shown in FIGS. 1, 2, 5*a*, 5*b*, 5*c* and 6, each of N number of second sliders (linear moving parts) 40 may be connected to one support 64 by means of a link mechanisms 62 which is displaceable in a plane perpendicular to the center axis. By virtue of this, by linearly moving one support 64 along the direction of the center axis by using one third drive part 66, N number of second sliders 40 may be simultaneously linearly moved by the same distance. In addition, the movement of support 64 by third drive part 66 may be realized by a simple structure using a ball screw, for example.

As first drive part 24, second drive part 28 and third drive part 66, various means, such as conventional rotating electric motor, may be used, as long as the means fulfills the function as described above. However, it is preferable to use servomotors as the first, second and third drive parts, since the drive parts may be operated at high velocities and with high accuracy.

Among first rollers 26, a roller driven by second drive part 28 may be manufactured from any material as long as the roller rotates object 18 by the rotation of the roller while contacting the object. However, in order to prevent the object from being damaged, it is preferable that the material of the roller be rubber, etc., having a certain degree of elasticity. On the other hand, freely rotatable first roller 26, second roller 42 and third roller 44 may be manufactured from any material as long as the rollers are rotated with the rotation of object 18 to which the rollers contact. However, in order to prevent the object from being damaged, it is also preferable that the material of the rollers be rubber, etc., having a certain degree of elasticity.

Figure 5A:
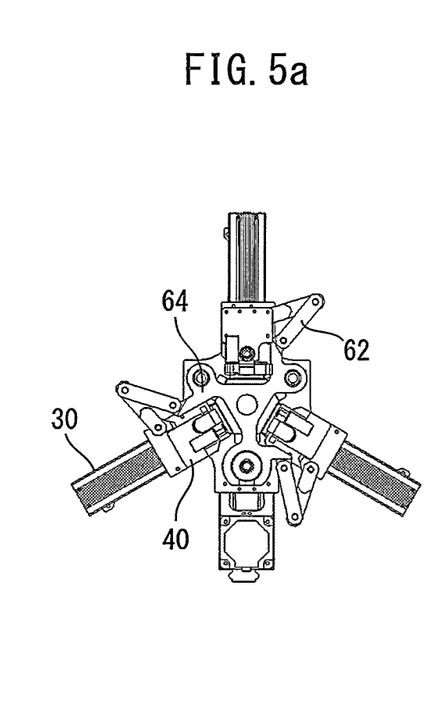
FIG. 5a is a view of the robot hand of FIG. 1 viewed from below, showing a state wherein N number of first sliders (or fingers) are positioned near the center of a hand base.
Figure 5B:
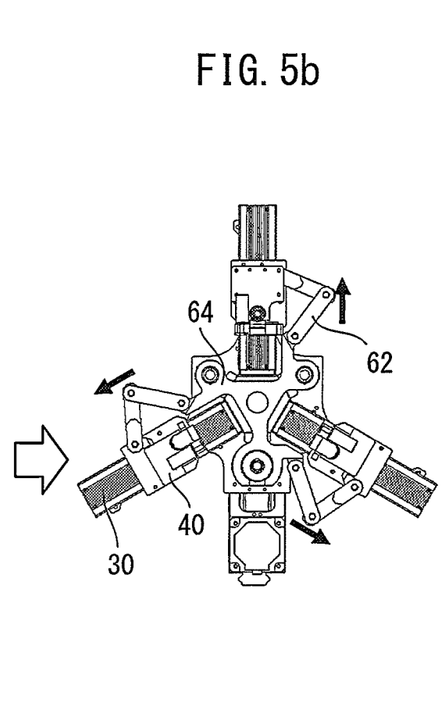
FIG. 5b is a view showing a state wherein the first sliders are radially outwardly moved from the center of the hand base.
Figure 5C:
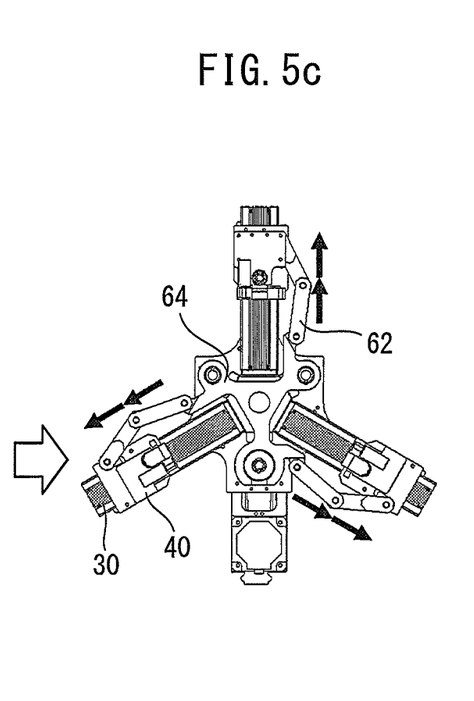
FIG. 5c is a view showing a state wherein the first sliders are further moved from the center of the hand base.

Hereinafter, a procedure for gripping and conveying cylindrical object 18 by means of robot hand 10 as described above, with reference to a flowchart of FIG. 6. First, the robot is operated so that robot hand 10 approaches cylindrical object 18 to be gripped (step S1). Due to this operation, as exemplified in FIG. 3*a*, fingers 22 are inserted into the hollow portion of object 18 and are positioned close to the inner peripheral portion of object 18. In this regard, as shown in FIG. 5*a* or 7*a*, it is preferable that fingers 22 be positioned near the center of hand base 20.

Figure 3B:
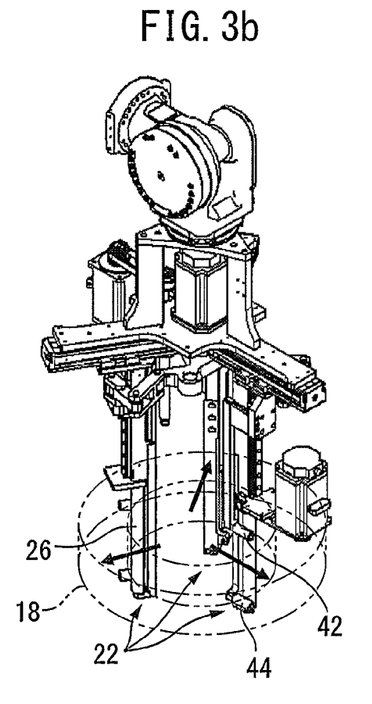
FIG. 3b is a view showing a state wherein the fingers are moved so as to grip an inner peripheral portion of the object.

Next, due to the motion of first linear moving mechanism by means of first drive part 24, as shown in FIG. 3*b*, N number of fingers 22 are radially outwardly moved so that N number of first rollers 26 contact the inner peripheral portion of object 18 (step S2). At this point, by using a force sensor, etc. (not shown), pressing force of first roller 26 against the inner peripheral portion of object 18 is detected, and it is judged as to whether gripping force calculated from the pressing force is appropriate (or within a predetermined range) or not (step S3). When the gripping force is appropriate, the procedure progresses to next step S4. Otherwise, the pressing force is corrected by operating first drive part 24. In other words, in step S3, cylindrical object 18 is gripped by means of N number of fingers 22 by force control based on feedback detection of the gripping force in the radial direction of object 18 generated by N number of fingers 22. By virtue of this, the control wherein the object is gripped by requisite minimum force is possible, whereby the load of first drive part 24 and/or first roller 26 may be reduced and a life thereof may be extended.

Figure 7A:
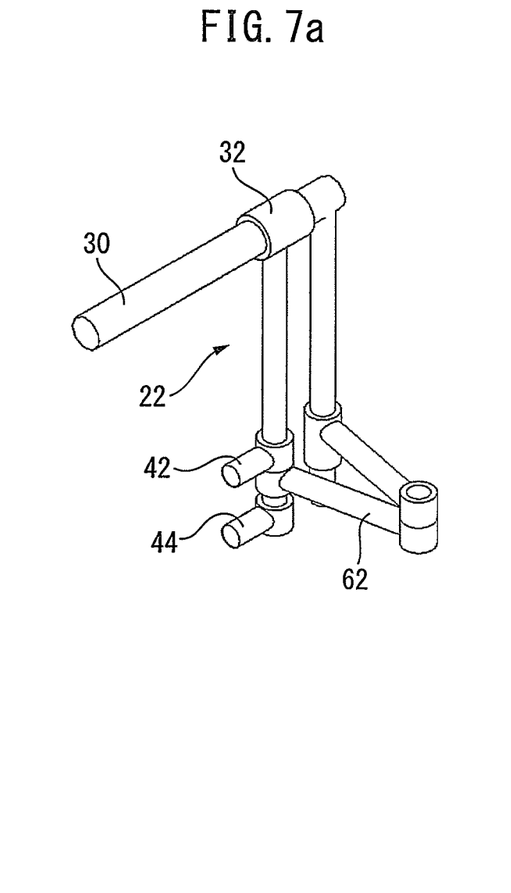
FIG. 7a is a view schematically showing a structure regarding the second and third rollers, showing a state wherein the fingers are positioned near the center of the hand base.
Figure 7B:
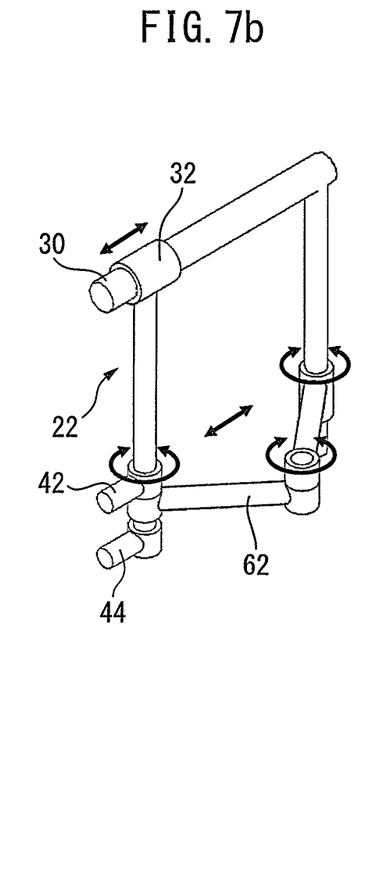
FIG. 7b is a view showing a state wherein the fingers are radially outwardly moved from the center of the hand base.
Figure 7C:
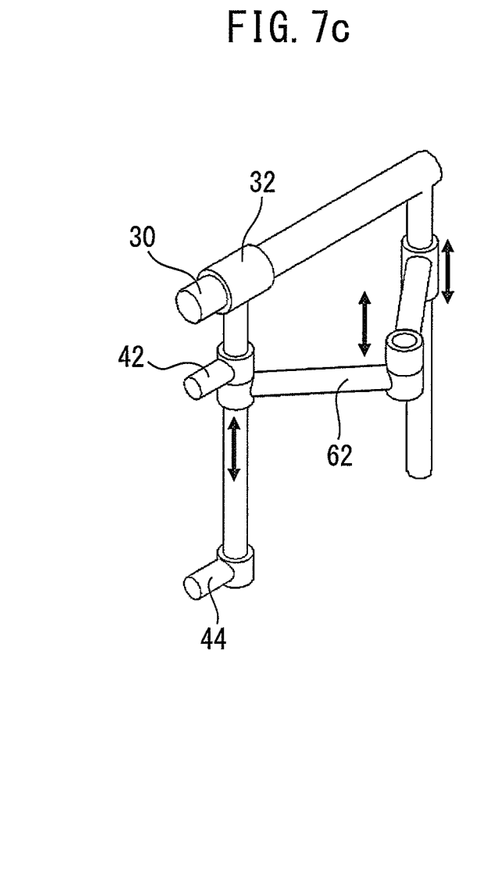
FIG. 7c is a view showing a state wherein the second roller is linearly moved away from the third roller.

In the next step S4, by moving the above second rollers, second rollers 42 and third rollers 44 contact object 18 so that opposing forces in the axial direction are applied to object 18. By virtue of this, the movement of object 18 in the axial direction thereof within the robot hand is restrained. For example, when the object has the shape as shown in FIG. 4*a*, fingers 22 are moved in the state wherein second roller 42 and third roller 44 are separated from each other by a distance larger than the axial length of object 18*a* (see FIG. 7*c*), and then, after first roller 26 comes into contact with inner peripheral portion 48 of object 18*a*, second roller 42 is moved toward third roller 44 so as to sandwich and restrain object 18*a*. On the other hand, when the object has the shape as shown in FIG. 4*b*, fingers 22 are moved in the state wherein second roller 42 and third roller 44 are close to each other (see FIGS. 7*a* and 7*b*), and then, after first roller 26 comes into contact with inner peripheral portion 56 of object 18*b*, second roller 42 is moved away from third roller 44 so as to restrain object 18*b* by means of force applied to the object in the axial direction from the inside to the outside of the object.

Next, by using a force sensor, etc. (not shown), pressing force of second roller 42 and third roller 44 against object 18 is detected, and it is judged as to whether restraining force calculated from the pressing force is appropriate (or within a predetermined range) or not (step S5). When the restraining force is appropriate, the procedure progresses to next step S6. Otherwise, the restraining force is corrected by operating third drive part 66. In other words, in step S5, cylindrical object 18 is restrained by means of second roller 42 and third roller 44 by force control based on feedback detection of the restraining force in the axial direction of the object generated by the second and third rollers. By virtue of this, the control wherein the object is restrained by requisite minimum force is possible, whereby the load of second roller 42 and/or third roller 44 may be reduced and a life thereof may be extended.

In the next step S6, the robot is operated so as to take out gripped object 18. For example, when the object is located on a pallet, etc., an operation for lifting the gripped object above the pallet is carried out. Otherwise, when a plurality of objects are randomly located in a box, etc., an operation for lifting the gripped object above the box is carried out.

Figure 3C:
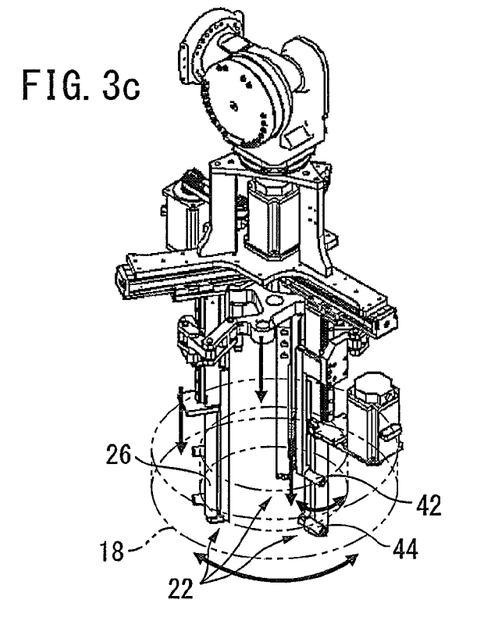
FIG. 3c is a view showing a state wherein second and third rollers hold an axial end of the object.

In the next step S7, taken out object 18 is conveyed to a predetermined delivery position, and if necessary, first roller 26 is rotationally driven so as to rotate gripped object 18 relative to hand base 20 (see FIG. 3*c*). In this regard, it is preferable that the conveyance and the rotation of the object be simultaneously carried out in view of a cycle time. However, the conveyance and the rotation may be sequentially carried out.

Finally, after gripped object 18 is conveyed to the predetermined delivery position, N number of fingers 22 are moved by first drive part 24 so that first rollers 26 are separated from the inner peripheral portion of object 18, whereby the delivery operation is completed (step S8). When a plurality of objects should be handled, steps S1 to S8 are repeated.

Figure 8:
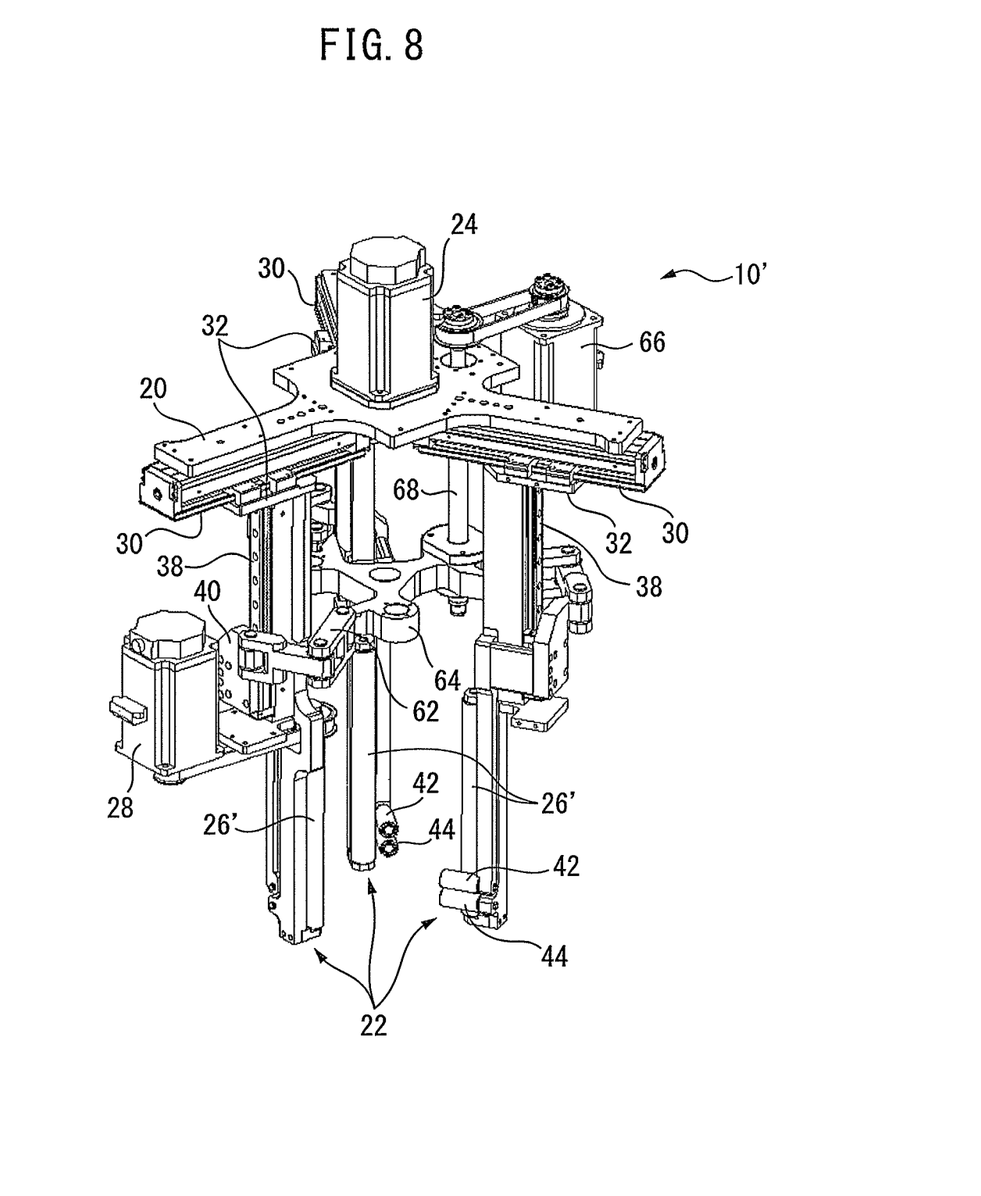
FIG. 8 is a perspective view of a robot hand according to a second embodiment of the present invention.
Figure 9:
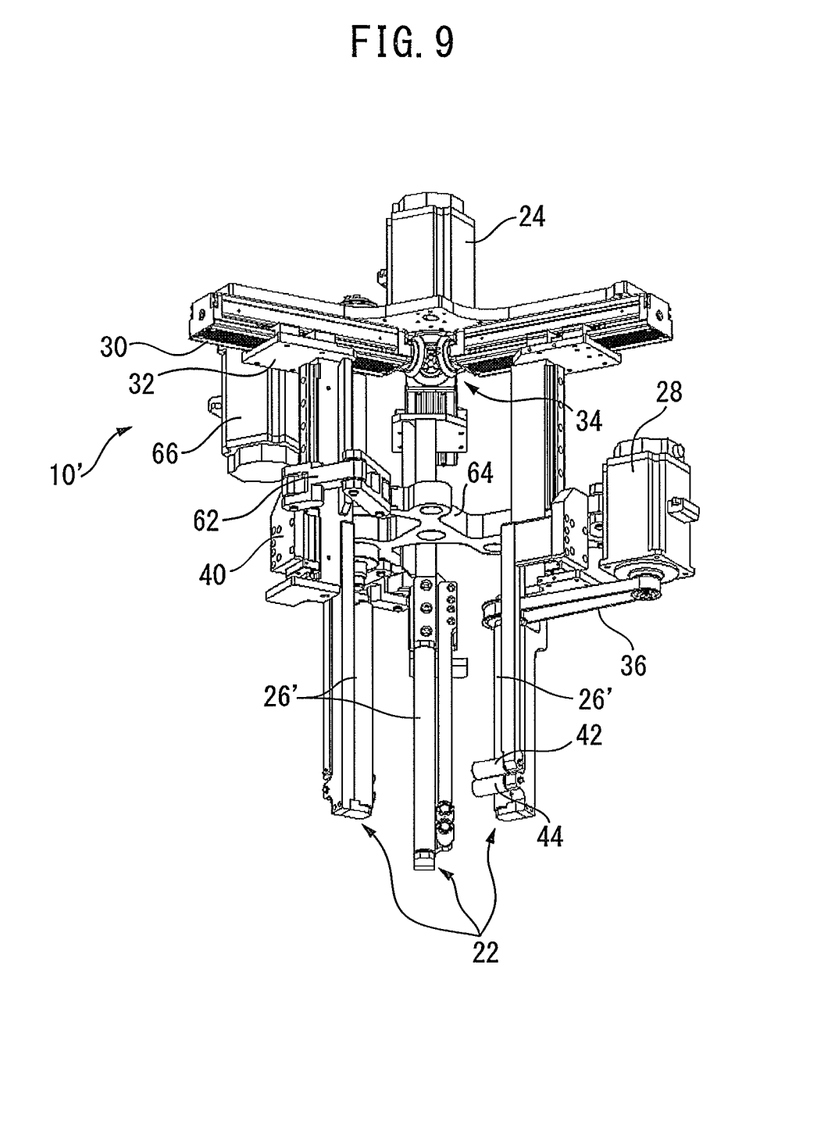
FIG. 9 is a perspective view of the robot hand of FIG. 8 viewed from obliquely below.

FIG. 8 is a perspective view of a robot hand 10' according to a second embodiment of the present invention, and FIG. 9 is a perspective view of robot hand 10' viewed from obliquely below. Robot hand 10 of the first embodiment is configured to grip the inner peripheral portion of object 18, whereas robot hand 10' is configured to grip an outer peripheral portion of the object. Since robot hand 10' may be the same as robot hand 10 except for the above point, only components of robot hand 10' different from robot hand 10 will be explained. Therefore, to the components of robot hand 10' corresponding to the components of robot hand 10, the same reference numerals are added, and detailed explanations thereof will be omitted.

Figure 10A:
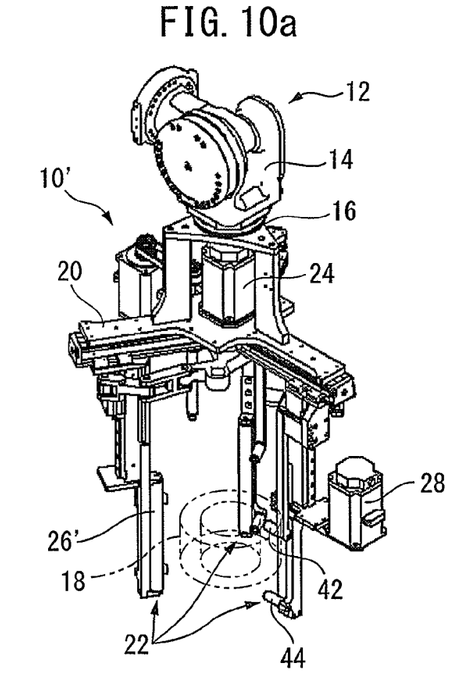
FIG. 10a is a view showing a state wherein fingers of the robot hand of FIG. 8 are inserted into a cylindrical object.
Figure 10B:
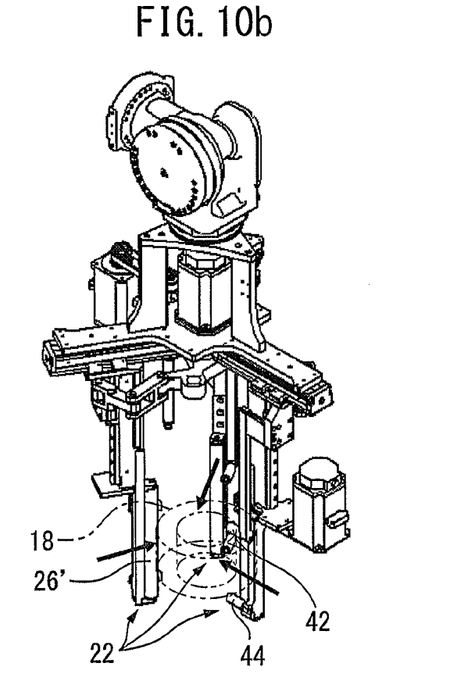
FIG. 10b is a view showing a state wherein the fingers are moved so as to grip an inner peripheral portion of the object.
Figure 10C:
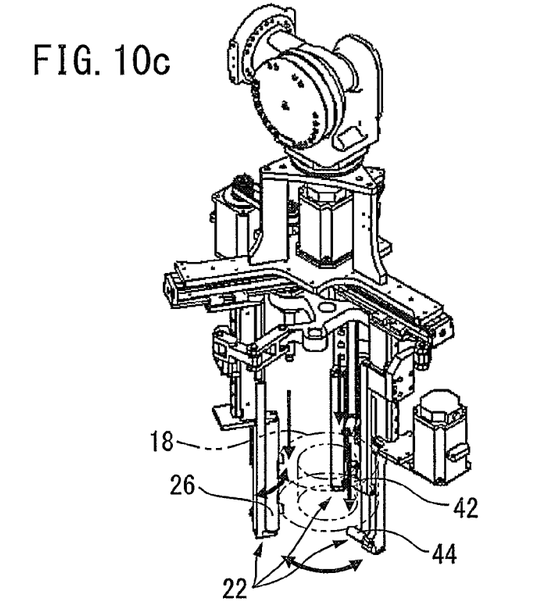
FIG. 10c is a view showing a state wherein second and third rollers hold an axial end of the object.

Robot hand 10' is configured to grip the outer peripheral portion of cylindrical object 18 and convey the object (see FIGS. 10*a* to 10*c*). In detail, N number of first rollers 26', respectively attached to N number of fingers 22, are configured to contact the outer peripheral portion of object 18 due to the radially outwardly movement of fingers 22 relative to hand base 20 by means of first drive part 24. Therefore, the N number of fingers properly contact the outer peripheral portion of cylindrical object 18. By rotationally driving at least one first roller 26' while a radially inward force is applied to object 18, the object may be rotated relative to hand base 20.

Figure 6:
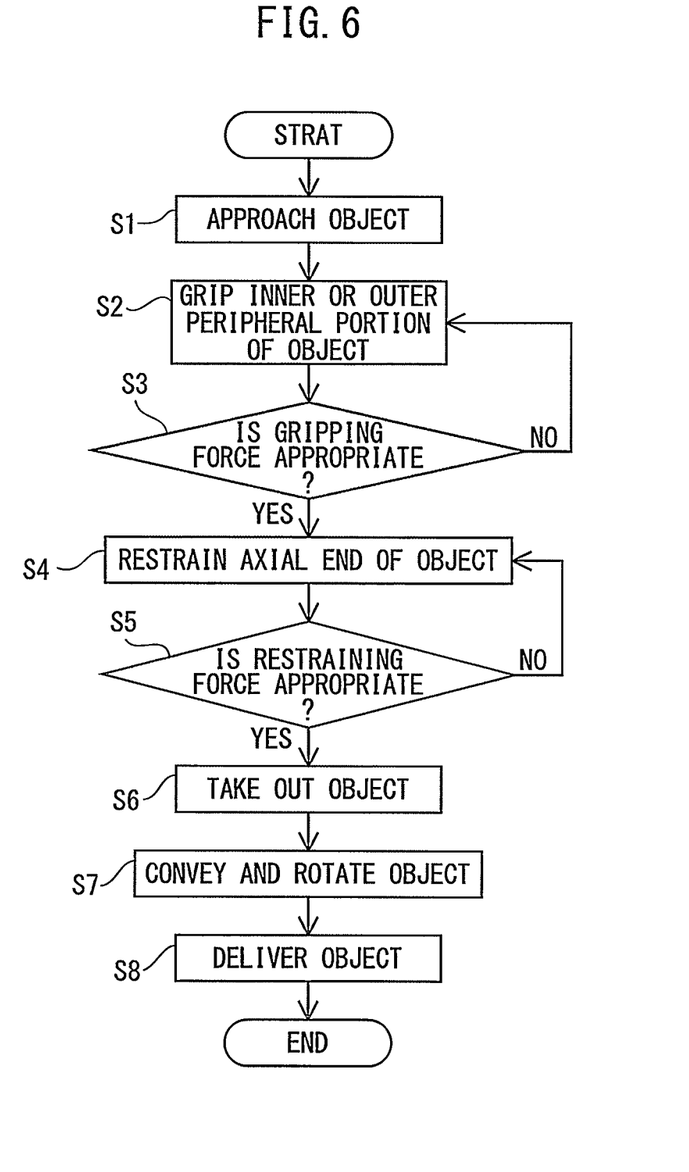
FIG. 6 is a flowchart showing a procedure for gripping and conveying the cylindrical object by means of the robot hand of the invention.

Regarding the flowchart of FIG. 6, when robot hand 10' is used, N number of first rollers 26' contact the outer peripheral portion of object 18 in step S2, and N number of fingers 22 are moved by first drive part 24 so that first rollers 26' are separated from the outer peripheral portion of object 18 in step S8. The other steps may be the same as the first embodiment.

FIG. 4*c* shows an example wherein an object 18*c* is gripped and conveyed by outer peripheral gripping-type robot hand 10' as describe above. In this case, object 18*c* may be solid without having a hollow portion. First rollers 26' are radially inwardly moved so as to contact an outer peripheral portion (surface) 70 of object 18*c* and grip object 18*c*. Second roller 42 and third roller 44 contact axial ends 72 and 74 of object 18*c* from the outside of the object, respectively, so as to restrain the axial movement of object 18*c*.

Herein, in addition to axial ends 50, 52, 72 and 74 as shown in FIGS. 4*a* and 4*c*, inner surfaces 58 and 60 of the object as shown in FIG. 4*b*, which are generally perpendicular to the center axis, are also referred to as the "axial ends." In other words, in the present invention, by the second and third rollers being in contact with the two axial ends of the cylindrical object, respectively, the predetermined restraining force can be generated for restraining the object in the axial direction. Herein, the "cylindrical object" means a member having a hollow portion (or a tubular member) when the inner peripheral portion thereof is gripped, whereas the cylindrical member also includes a member without having a hollow portion (or a solid member) when the outer peripheral portion is gripped.

According to the present invention, since the cylindrical object is rotated by the first roller arranged on the finger of the hand, it is not necessary to rotate the robot hand in order to rotate the object. Therefore, the cable, etc., connected to the hand is not adversely affected. Since the hand can grip and rotate the object, the number of repetition of gripping the object can be decreased, whereby a cycle time of the robot operation can be reduced. Further, the cylindrical object can be rotated in any posture of the robot, whereby workability of the robot may be improved.

Due to the structure wherein the N number of fingers are simultaneously moved by the same distance by means of one first drive part, the control of the robot can be simplified and the robot hand can be manufactured at low cost. In addition, it is easy to move the fingers so that the circumcircle of the N-sided polygon constituted by the fingers is arranged in a concentric pattern about the center axis of the object.

By using the second and third rollers, the cylindrical object can easily be restrained in the axial direction thereof. Further, by connecting the N number of linear moving parts, to which the second rollers are attached, to one support, all of the second rollers can be linearly moved by means of one third drive part.

Due to the feedback control of the gripping force or the restraining force, the load of the drive part and the pressing force of the roller can be reduced, whereby a life of the drive part and/or the roller can be extended.

While the invention has been described with reference to specific embodiments chosen for the purpose of illustration, it should be apparent that numerous modifications could be made thereto, by a person skilled in the art, without departing from the basic concept and scope of the invention.

The invention claimed is:

1. A robot hand configured to grip an inner or outer peripheral portion of a cylindrical object and rotate the object about a center axis of the object while gripping the object, the robot hand comprising:
   a hand base attached to a front end of a robot arm;
   N number of fingers movably attached to the hand base, wherein each finger extends parallel to the center axis of the object gripped by the fingers and is positioned at each vertex of a N-sided polygon in a plane perpendicular to the center axis;
   a first drive part which moves the N number of fingers relative to the hand base so that a circumcircle of the N-sided polygon is arranged in a concentric pattern about the center axis;
   N number of first rollers respectively attached to the N number of fingers, wherein each first roller is rotatable about an axis parallel to the center axis and is configured to contact the inner or outer peripheral portion of the object by movement of the finger relative to the hand base; and
   a second drive part which rotates at least one of the N number of first rollers,
   wherein N is a natural number of three or more; and
   further including:
   N number of linear moving parts respectively attached to the N number of fingers and configured to linearly move in the extending direction of the finger;
   a third drive part which linearly drive the linear moving parts relative to the respective fingers;
   second rollers attached to the respective linear moving parts so that the second roller is rotatable about an axis along a radial direction of the circumcircle; and
   third rollers arranged on portions of the respective N number of fingers farther than the respective second rollers from the hand ease in relation to the center axis wherein the third rollers have rotation axes parallel to rotation axes of the respective second rollers.

2. The robot hand as set forth in claim 1, wherein the N number of fingers are configured to be simultaneously moved by the same distance by of one first drive part.

3. The robot hand as set forth in claim 1, wherein the N number of linear moving parts are connected to one support by a link mechanism which is displaceable in a plane perpendicular to the center axis, and wherein one support is linearly moved by one third drive part.

4. The robot hand as set forth in claim 1, wherein the cylindrical object is restrained by the second and third rollers by force control based on feedback detection of restraining force in the axial direction generated by the second and third rollers.

5. The robot hand as set forth in claim 1, wherein at least one of the first, second and third drive parts is a servomotor.

6. The robot hand as set forth in claim 1, wherein the cylindrical object is gripped by the N number of fingers by force control based on feedback detection of gripping force in the radial direction generated by the N number of fingers.

7. A robot comprising the robot hand as set forth in claim 1.

* * * * *